United States Patent [19]

Kim

[11] Patent Number: 5,920,355
[45] Date of Patent: Jul. 6, 1999

[54] IMAGE PROCESSING APPARATUS HAVING ON-SCREEN DISPLAY FUNCTION

[75] Inventor: Jeong-Seob Kim, Seoul, Rep. of Korea

[73] Assignee: Daewoo Electronics Co., Ltd., Seoul, Rep. of Korea

[21] Appl. No.: 08/921,111

[22] Filed: Aug. 29, 1997

[30] Foreign Application Priority Data

Aug. 31, 1996 [KR] Rep. of Korea ............... 96-37572

[51] Int. Cl.$^6$ .................................................. H04N 5/445
[52] U.S. Cl. ...................... 348/569; 348/589; 348/564
[58] Field of Search .................................. 348/569, 564, 348/589, 598, 599, 600, 563, 471, 472, 476; H04N 5/445, 5/278

[56] References Cited

U.S. PATENT DOCUMENTS 5,631,711  5/1997  Yang ........................................ 348/563

FOREIGN PATENT DOCUMENTS

0798920A2  10/1997  European Pat. Off. .

Primary Examiner—Sherrie Hsia
Attorney, Agent, or Firm—Jacobson, Price, Holman & Stern, PLLC

[57] ABSTRACT

An image processing apparatus having on-screen display function. The image processing apparatus has a signal converter for converting RGB color signals into analog signals and transmitting them through one line, a signal re-converter for re-converting the transmitted signals into the RGB color signals, an OSD signal processor for generating OSD character signals from the RGB color signals and blanking signals. The signal converter is a D/A converter, or PWM processor and integrator, and the signal re-converter is an A/D converter. The signal converter is installed inside a microprocessor together with the OSD signal generator, and the signal re-converter is installed inside the OSD signal processor. Since the RGB color signal is transmitted through one line, the layout is simple and noise due to the interference between the signals is prevented. Further, diverse colors can be expressed since the color signals are subdivided and the voltage levels of the analog signals produced by the signal converter are subdivided according to the number of the subdivided color signals.

4 Claims, 6 Drawing Sheets

| R | G | B | DAC |
|---|---|---|---|
| 0 | 0 | 0 | GND |
| 0 | 0 | 1 | 1/7.VDD |
| 0 | 1 | 1 | 2/7.VDD |
| 0 | 1 | 0 | 3/7.VDD |
| 1 | 1 | 0 | 4/7.VDD |
| 1 | 0 | 0 | 5/7.VDD |
| 1 | 0 | 1 | 6/7.VDD |
| 1 | 1 | 1 | 7/7.VDD |

FIG.6

| 1/4.R | 2/4.R | 3/4.R | 4/4.R |
| 1/4.G | 2/4.G | 3/4.G | 4/4.G |
| 1/4.B | 2/4.B | 3/4.B | 4/4.B |

IMAGE PROCESSING APPARATUS HAVING ON-SCREEN DISPLAY FUNCTION

BACKGROUND OF THE INVENTION

1. Field of the Invention

The present invention relates to an image processing apparatus having OSD (on-screen display) function, and more particularly to an image processing apparatus for transmitting RGB color signals among the OSD signals for displaying the explanation about the guidance for specific functions or the operational status thereof on the screen through one line.

2. Prior Art

An image processing apparatus such as a television has an OSD (on-screen display) function for displaying the operational status thereof. Such an image processing apparatus having OSD function displays the operational statuses for the control of volume, selection of channel, change of mode, or PIP (picture in picture) function on the screen when a user operates remote controller or various operating buttons.

Figure 1:
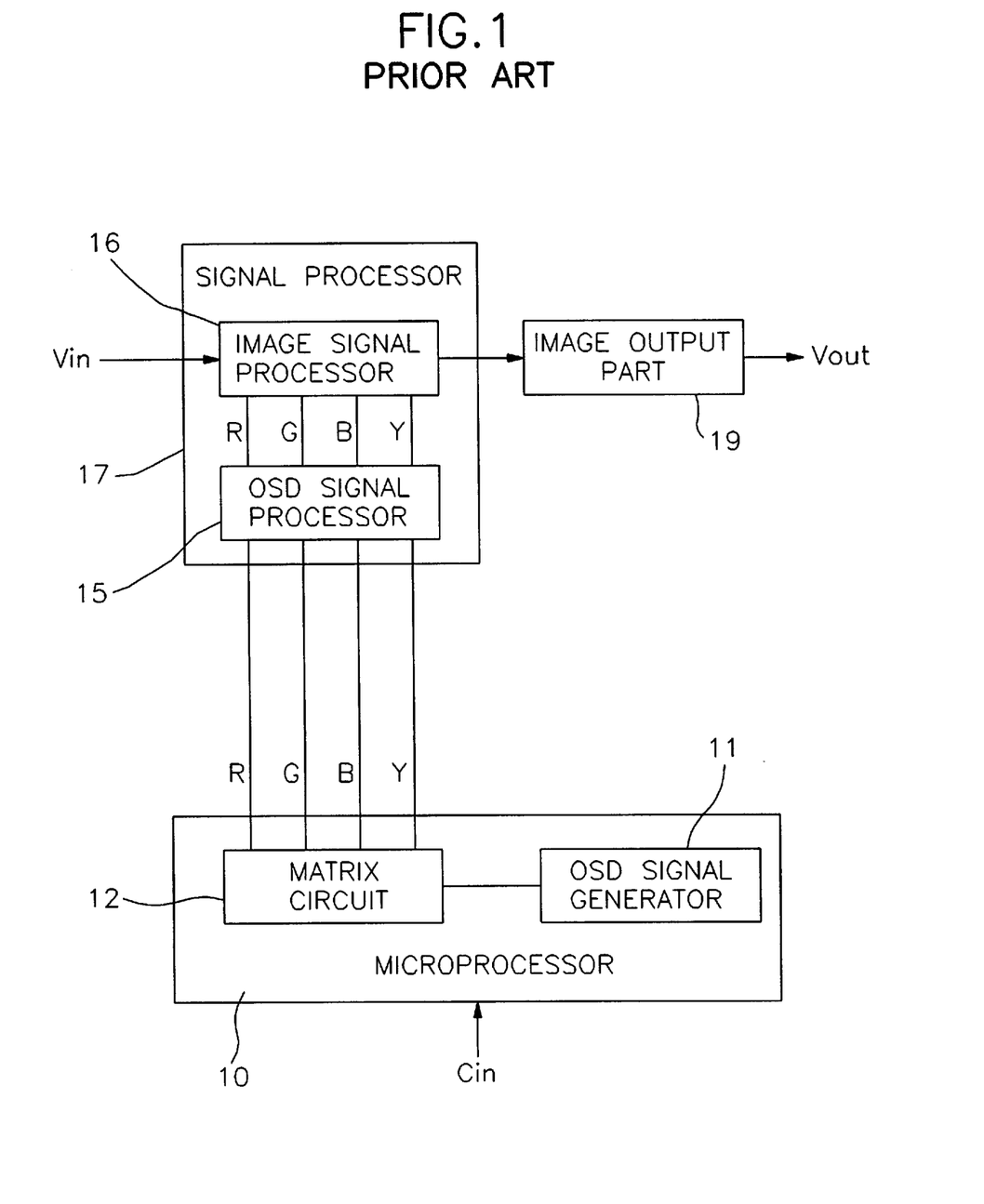
FIG. 1 is a block diagram for a conventional image processing apparatus having OSD function.

FIG. 1 is a block diagram for a general image processing apparatus having OSD function. The image processing apparatus has a microprocessor 10 for generating OSD signals according to the control signal Cin inputted by the operation of a remote controller or the like, a signal processor 17 for synthesizing the OSD signals transmitted from the microprocessor 10 with image signals Vin, and image output part 19 for outputting the signals processed by the signal processor 17 toward an image display device (not shown) such as a CRT (Cathode-Ray Tube) or the like.

The microprocessor 10 contains an OSD signal generator 11 and a matrix circuit 12. The OSD signal generator 11 generates the OSD signals according to the inputted control signal Cin. The matrix circuit 12 receives the signals from the OSD signal generator 11, and produces blanking signals Y and RGS color signals which consist of red color signal R, green color signal G, and blue color signal B. Each color signal of the RGB color signals is transmitted with lines allotted respectively thereto, and the blanking signals Y are transmitted through at least one line. The OSD signals produced by the matrix circuit 12 are inputted to the signal processor 17.

The signal processor 17 comprises an OSD signal processor 15 and an image signal processor 16. The OSD signals inputted to the signal processor 17 are changed by the OSD signal processor 15 into OSD character signals which consist of R, G, B, and Y character signals. The OSD character signals are inputted to the image signal processor 16, and the image signal processor 16 synthesizes the image signals Vin with the OSD character signals. The synthesized signals are inputted to the image output part 19, and the image output part 19 changes these signals into signals Vout for displaying on the CRT. The OSD characters are displayed by the signals vout, and then the user perceives the statuses of the channel selection, volume control, etc., through the OSD characters displayed on the screen.

However, in such an image processing apparatus, for the transmission of the RGB color signals R, G, B and the blanking signals Y which are inputted from the microprocessor 10 to the OSD signal processor 15, at least four ports in the microprocessor 10 should be occupied. Thus, the layout for the processing of the OSD signals between the microprocessor 10 and the OSD signal processor are complex. Furthermore, due to a recent tendency to allot additional port for use in the luminance control in order to control the brightness of the OSD character, the layout of the microprocessor becomes more complex. Moreover, when the RGB color signals R, G, B and the blanking signals Y are transmitted, the interference between each of the signals may occur to generate noise, so the OSD characters are displayed in an unstable fashion on the image display device.

Further, the color of the OSD character is determined merely by the ON/OFF control of the RGB color signals R, G, B, so only about eight colors can be implemented and diverse colors cannot be provided.

SUMMARY OF THE INVENTION

The present invention has been proposed to overcome the above described problems in the prior art, and accordingly it is an object of the present invention to provide an image processing apparatus in which the RGB color signals are transmitted through one line in order that the layout thereof is simple and noise due to the interference between the signals is prevented.

Also it is another object of the present invention to provide an image processing apparatus in which, when the RGB color signals are transmitted through one line as described above, the voltage levels for the transmitted RGB color signals are subdivided so that the OSD characters can be displayed with diverse colors.

To achieve the above object, the present invention provides an image processing apparatus having an OSD signal processor for generating OSD character signals from OSD signals including RGB color signals and blanking signals which are inputted thereto, and a image signal processor for synthesizing the OSD character signals and image signals to transmit the synthesized signals to an image display device, said apparatus comprising: an OSD signal generator for generating the OSD signals; a signal converter for converting the RGB color signals among the signals generated from said OSD signal generator into analog signals, said signal converter for transmitting the analog signals through one line; and a signal re-converter for re-converting the transmitted analog signals into digital signals to reproduce the RGB color signals, said signal re-converter for transmitting the reproduced RGB color signals through a plurality of lines to said OSD signal processor.

It is preferable that the signal converter is implemented by a D/A converter, or PWM processor and integrator, and the signal re-converter is implemented by an A/D converter.

Further, to achieve the above another object, the present invention provides an image processing apparatus as described above wherein respective signals for respective colors in the RGB color signals are subdivided into a predetermined number of color signals which are different from each other in intensities thereof, and said D/A converter produces signals having a plurality of voltage levels which respectively correspond to colors implemented by combinations of each subdivided color signal.

BRIEF DESCRIPTION OF THE DRAWINGS

The present invention will be better understood and its various objects and advantages will be more fully appreciated from the following description taken in conjunction with the accompanying drawings, in which.

DETAILED DESCRIPTION OF THE PREFERRED EMBODIMENT

Hereinafter, the present invention will be described in detail with reference to the drawings.

Figure 2:
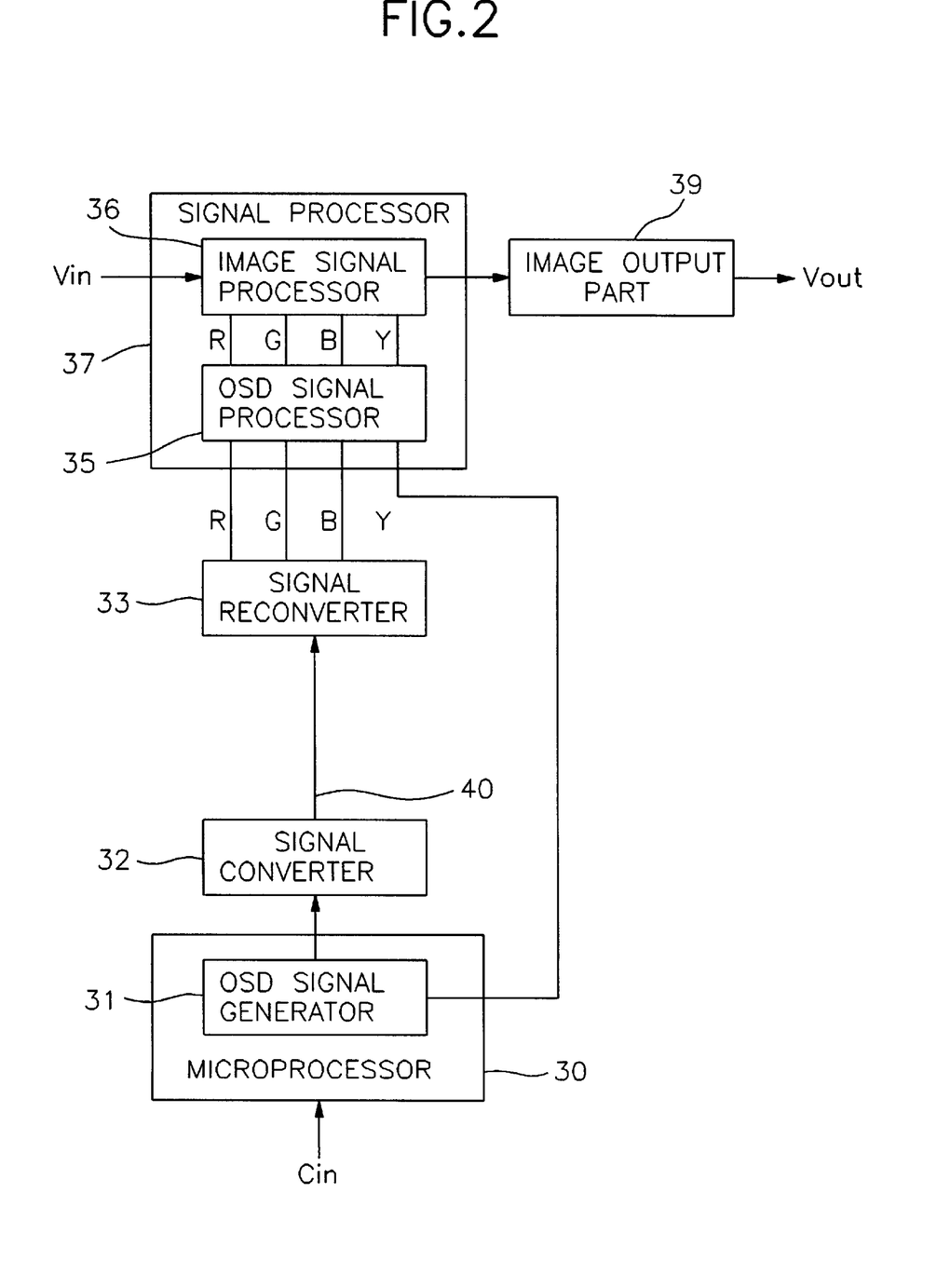
FIG. 2 is a block diagram for an image processing apparatus according to the present invention.

FIG. 2 is a block diagram for an image processing apparatus according to the present invention. The image processing apparatus according to the present invention has, as the conventional image processing apparatus shown in FIG. 1, a microprocessor 30 for generating OSD signals according to the control signal Cin inputted by the operation of a remote controller or the like, a signal processor 37 for synthesizing the OSD signals transmitted from the microprocessor 30 with image signals Vin, and image output part 39 for outputting the signals processed by the signal processor 37 toward an image display device (not shown) such as a CRT (Cathode-Ray Tube) or the like. Between the microprocessor 30 and the signal processor 37, a signal converter 32 and the signal re-converter 33 for transmitting the OSD signals generated from the microprocessor 30 are disposed.

The microprocessor 30 contains an OSD signal generator 31. The OSD signal generator 31 generates the OSD signals according to the inputted control signal Cin. The OSD signals comprise RGB color signals which provide the information concerning the colors of the characters displayed by the OSD function, and the blanking signals Y which provide the information concerning the position for displaying the OSD characters on the screen. Among the OSD signals generated from the microprocessor 30, the RGB color signals are inputted to the signal converter 32. The signal converter 32 converts the OSD signals and transmits through one transmission line 40. The OSD signals transmitted by the transmission line 40 are re-converted by the re-converter 33, and then inputted to the signal processor 37. The signal re-converter 33 performs the function to re-convert the information transmitted serially through the transmission line 40 into the RGB color signals consisting of many bits in order to input to the signal processor 37. The blanking signals Y among the OSD signals generated from the microprocessor 30 are inputted directly to the signal processor 37. The blanking signals Y are transmitted through at least one line.

The signal processor 37 comprises an OSD signal processor 35 and an image signal processor 36. The OSD signals inputted to the signal processor 37 are changed by the OSD signal processor 35 into OSD character signals which consist of R, G, B, and Y character signals. The OSD character signals are inputted to the image signal processor 36, and the image signal processor 36 synthesizes the image signals Vin with the OSD character signals. The synthesized signals are inputted to the image output part 39, and the image output part 39 changes these signals into signals Vout for displaying on the CRT. The OSD characters are displayed by the signals Vout.

Figure 3:
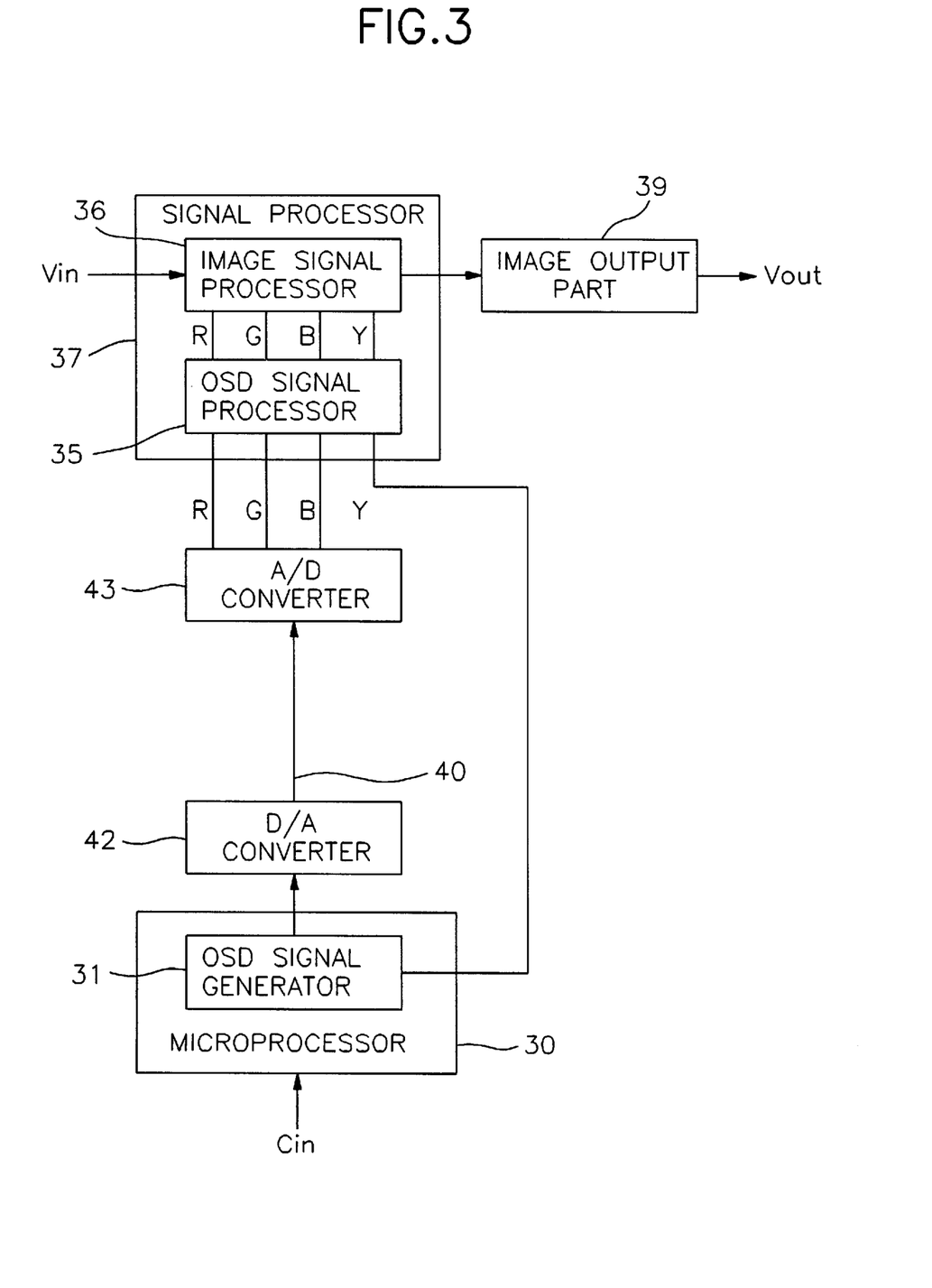
FIG. 3 is a block diagram for an image processing apparatus according to an embodiment of FIG. 2.

FIG. 3 is a block diagram for an image processing apparatus according to an embodiment of FIG. 2. In this embodiment, the signal converter 32 is implemented by a D/A converter 42, and the signal re-converter 33 is implemented by an A/D converter 43. The RGB color signals generated from the OSD signal generator 31 in the microprocessor 30 are serially transmitted to the D/A converter through one bus line or a plurality of bus lines. The D/A converter 42 converts the RGB color signals into analog signals in order to transmit through the one transmission line 40. The A/D converter 43 converts the analog signals transmitted through the transmission line 40 into digital signals, and then inputs them to the signal processor 37 through three lines.

As illustrated above, since the signals generated from the microprocessor 30 are converted to the analog signals and transmitted through one transmission line 40, the layout is simple in comparison with the manner that transmits the RGB color signals through a plurality of lines, and the noise due to the interference between the signals is prevented whereby OSD function of high display quality is achieved. In the embodiment of FIG. 3, the D/A converter 42 is attached outside the microprocessor 30, but if the microprocessor containing the D/A converter is adopted, the additional D/A converter 42 doesn't have to be attached and the present invention can be implemented by using the D/A converter in the microprocessor.

Figure 4:
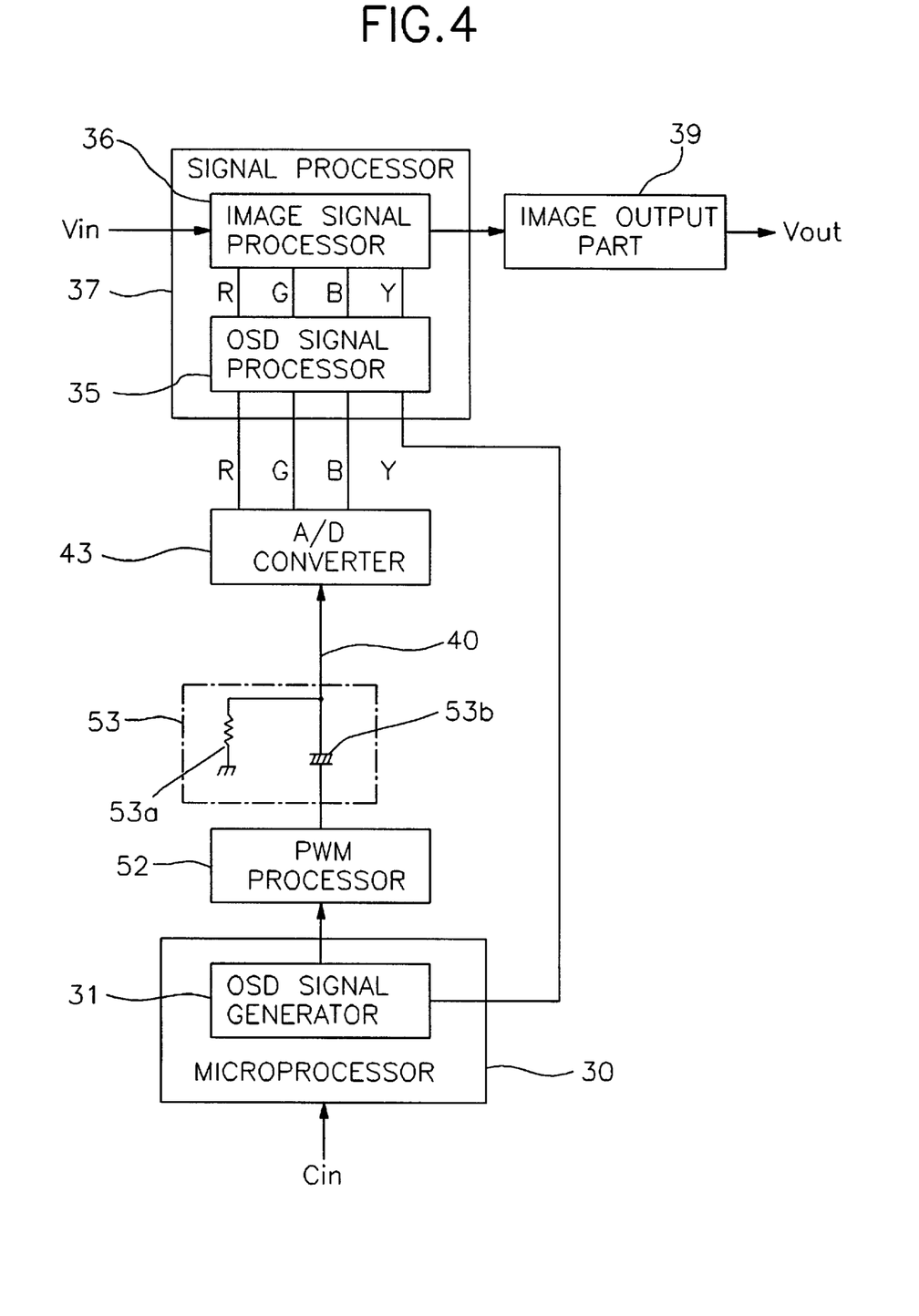
FIG. 4 is a block diagram for an image processing apparatus according to another embodiment of FIG. 2.

FIG. 4 is a block diagram for an image processing apparatus according to another embodiment of FIG. 2. In this embodiment, the signal converter 32 consists of a PWM processor 52 and an integrator 53, and the signal re-converter 33 is implemented by the A/D converter 43. The information concerning the RGB colors generated from the OSD signal generator 31 in the microprocessor 30 is serially transmitted to the PWM processor 52 through one bus line or a plurality of bus lines. The PWM processor 52 performs the pulse width modulation to the RGB color signals, and the integrator 53 consisting of a resistor 53a and a capacitor 53b performs the integration to the modulated signals to convert them into analog signals. The analog signals are transmitted to the A/D converter 43 through the one transmission line 40, and the A/D converter 43 converts the analog signals into digital signals and inputs them to the signal processor 37 through three lines.

As illustrated above, since the signals generated from the microprocessor 30 are converted to the analog signals by the pulse width modulation and the integration and then transmitted through one transmission line 40, as in the embodiment in FIG. 3, the effect is achieved that the layout becomes simple and the noise due to the interference between the signals is prevented. In the embodiment of FIG. 4, the PWM processor 52 is attached outside the microprocessor 30, but if the microprocessor containing the PWM processor is adopted, the additional PWM processor 52 doesn't have to be attached and the present invention can be implemented by using the PWM processor in the microprocessor.

Furthermore, although the A/D converter 43 is attached outside the OSD signal processor 35 in the embodiments shown in FIGS. 3 and 4, if the OSD signal processor containing the A/D converter is adopted, the additional A/D converter 43 doesn't have to be attached and the present invention can be implemented by using the A/D converter in the OSD signal processor. Recently, the microprocessor containing the D/A converter 42 and the PWM processor 52, and the OSD signal processor containing the A/D converter have been commonly used, then if such microprocessor and OSD signal processor are adopted, the present invention can be implemented in a simpler manner without the additional D/A converter 42, PWM processor 52, and the A/D converter 43. Moreover, according to the present invention, the subsidiary effect is achieved that the matrix circuit for generating the RGB color signals need not be installed inside the microprocessor 30.

Figure 5:
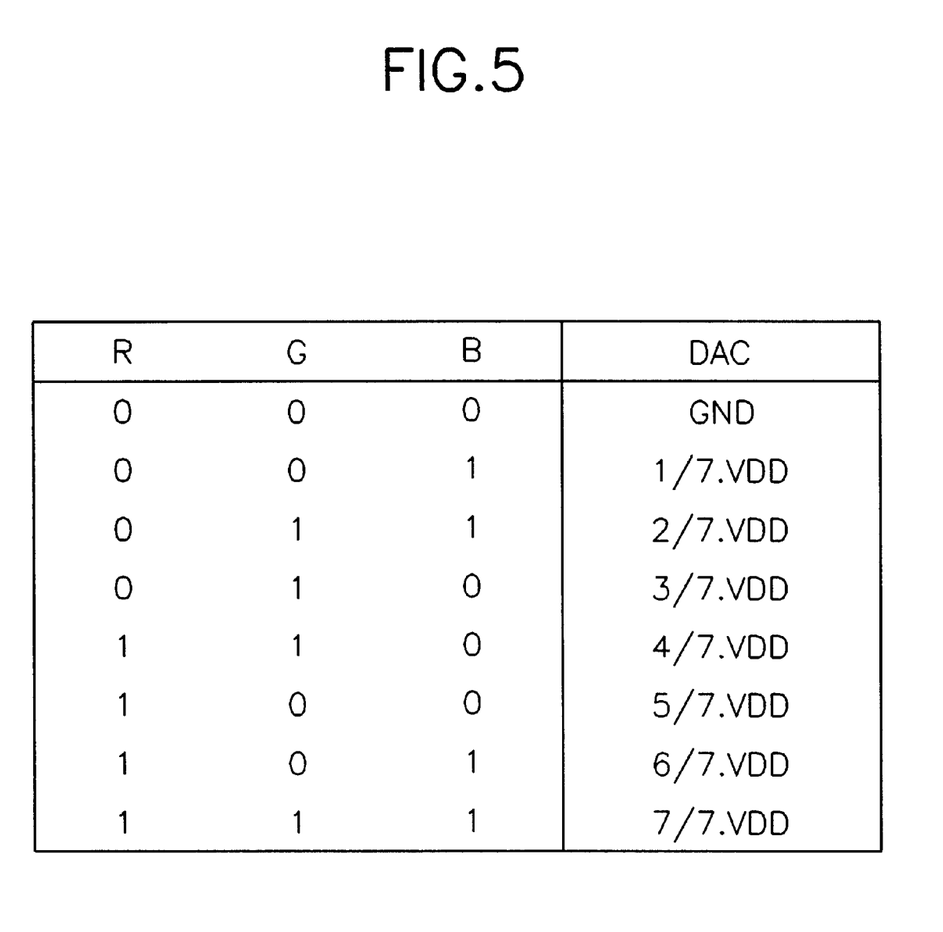
FIG. 5 is a table showing an example for setting the voltage levels corresponding to the RGB color signals.

FIG. 5 is a table showing an example for setting the voltage levels corresponding to the RGB color signals, in which eight colors are implemented by the combination of the red, green, and blue signals in the RGB color signals. The color of the OSD characters is determined by ON/OFF of the red, green, and blue signals respectively, and the number of the colors implemented by such a combination is eight. (In FIG. 5, the number '1' means ON and '0' means OFF for the corresponding color signal.) The signal converter 32 implemented by the D/A converter 42 in FIG. 3 or by PWM processor 52 and the integrator 53 in FIG. 4 produces the analog signals having eight voltage levels corresponding to the eight colors. That is, if the minimum voltage produced by the signal converter 32 is 0 V and the maximum voltage produced is VDD, the eight voltage levels are set by equally dividing the voltage level from 0 V to VDD such as 0 V, 1/7 VDD, 2/7 VDD, . . . , and 7/7 VDD, and the eight voltage levels correspond to the eight colors respectively. The signal re-converter 33 implemented by the A/D converter 43 produces the RGB color signals corresponding to the respective voltage levels. The RGB color signals are transmitted through the one transmission line 40 by such a fashion.

In that situation, if the voltage levels for the respective RGB color signals are subdivided, the OSD characters can be expressed with many diverse colors. That is, although the red signal, green signal, and the blue signal are respectively ON or OFF to implement eight colors, if the respective colors are subdivided to a predetermined number of colors which are different from each other in the intensities thereof, more diverse colors can be achieved by the combination of the subdivided colors.

Figure 6:
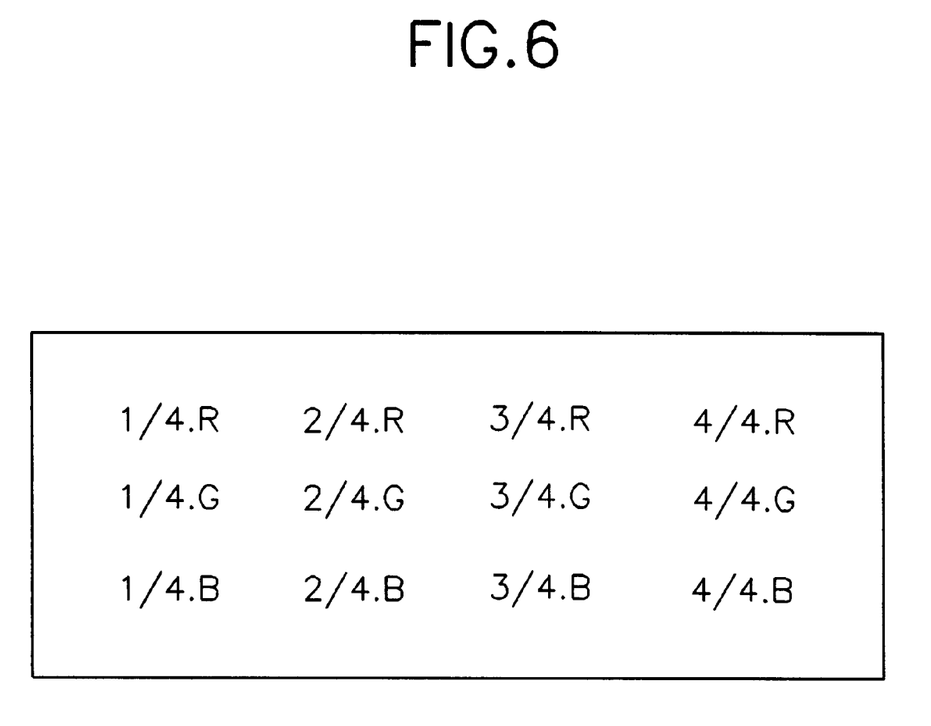
FIG. 6 is a table showing an example for subdividing the RGB color signals.

FIG. 6 is a table showing an example for subdividing the RGB color signals. The respective colors are subdivided into four colors according to the intensity thereof. For example, the red color is subdivided into 1/4R, 2/4R, 3/4R and 4/4R according to the intensity thereof, and the green color and the blue color are subdivided respectively into four colors by the same manner. The OSD characters can be expressed with 64 kinds of colors by the combination of the colors subdivided by such a manner. The microprocessor 30 generates corresponding signals to the 64 kinds of colors according to the control signal Cin inputted by the user. The voltage levels of the analog signal produced by the signal converter 32 are subdivided to 64 voltage levels to correspond to the 64 kinds of colors. That is, the voltage from 0 V to VDD is subdivided to the voltage levels such as 0 V, 1/63 VDD, 2/63 VDD, . . . , 62/63 VDD, and 63/63 VDD. The subdivided voltage levels correspond respectively to the 64 kinds of colors. The signal re-converter 33 implemented by the A/D converter 43 produces the RGB color signals corresponding to such voltage levels. In that situation, to transmit 64 kinds of RGB color signals, the A/D converter 43 and the OSD signal processor 35 can be connected by six lines to transmit the six bit data at a time, or it is possible to connect with three lines and transmit six bit data by transmitting three bit data two times. It is preferable to transmit two times with three bit so that additional lines need not be attached between the A/D converter 43 and the OSD signal processor 35, and between the OSD signal processor 35 and the image signal processor 36 in order to use conventional configuration without additional variation.

If the microprocessor 30 and the OSD signal processor 35 is connected by many lines as in the conventional image processing apparatus, in order to implement 64 kinds of colors, two lines should be allotted to the respective R, G, 2 color signals to transmit the four kinds of subdivided signals respectively, so the layout becomes more complex and noise due to the interference between the signals becomes greater. However, according to the present invention, since the signals having subdivided voltage levels are transmitted through one transmission line, the diverse colors can be expressed without the additional lines. Although the example in which intensities of respective colors are subdivided into four colors to express 64 kinds of colors is illustrated in this embodiment, more or less colors can be implemented by controlling the number of subdivided colors and voltage levels corresponding thereto.

As illustrated above, according to the present invention, since the RGB color signals are transmitted through one transmission line, the layout is simple and noise due to the interference between the signals does not occur, and particularly, if the D/A converter or PWM processor installed inside the microprocessor 30 and the A/D converter installed inside the OSD signal processor 35 is used, the layout can be simpler. Further, the OSD characters can be expressed in diverse colors by transmitting many subdivided voltage levels corresponding to many color signals respectively.

Although the present invention has been described and illustrated in detail, it is clearly understood that the same is by way of illustration and example only and is not to be taken by way of limitation, wherein the spirit and scope of the present invention is limited only by the terms of the appended claims.

What is claimed is:

1. An image processing apparatus having an OSD signal processor for generating OSD character signals from OSD signals including RGB color signals and blanking signals which are inputted thereto, and a image signal processor for synthesizing the OSD character signals and image signals to transmit the synthesized signals to an image display device, said apparatus comprising:

an OSD signal generator for generating the OSD signals;

a D/A converter for converting the RGB color signals among the signals generated from said OSD signal generator into analog signals, said D/A converter for transmitting the analog signals through one line; and an A/D converter for re-converting the transmitted analog signals into digital signals to reproduce the RGB color signals, said A/D converter for transmitting the reproduced RGB color signals through a plurality of lines to said OSD signal processor.

2. The image processing apparatus as claimed in claim 1, wherein respective signals for respective colors in the RGB color signals are subdivided by a predetermined number of color signals which are different from each other in intensities thereof, and said D/A converter produces signals having a plurality of voltage levels which respectively correspond to colors implemented by combinations of each subdivided color signal.

3. An image processing apparatus having an OSD signal processor for generating OSD character signals from OSD signals including RGB color signals and blanking signals which are inputted thereto, and a image signal processor for synthesizing the OSD character signals and image signals to transmit the synthesized signals to an image display device, said apparatus comprising:

an OSD signal generator for generating the OSD signals;

a PWM processor for performing pulse width modulation to the RGB color signals among the signals generated from said OSD signal generator;

an integrator for integrating the modulated signals, said integrator for transmitting analog signals generated by the integration through one line; and an A/D converter for re-converting the transmitted analog signals into digital signals to reproduce the RGB color signals, said A/D converter for transmitting the reproduced RGB color signals through a plurality of lines to said OSD signal processor.

4. The image processing apparatus as claimed in claim 3, wherein respective signals for respective colors in the RGB color signals are subdivided by a predetermined number of color signals which are different from each other in intensities thereof, and said integrator produces signals having a plurality of voltage levels which respectively correspond to colors implemented by combinations of each subdivided color signal.

* * * * *